United States Patent [19]

Auracher et al.

[11] 4,440,468
[45] Apr. 3, 1984

[54] PLANAR WAVEGUIDE BRAGG LENS AND ITS UTILIZATION

[75] Inventors: Franz Auracher, Baierbrunn; Michael Stockmann, Munich, both of Fed. Rep. of Germany

[73] Assignee: Siemens Aktiengesellschaft, Berlin & Munich, Fed. Rep. of Germany

[21] Appl. No.: 296,134

[22] Filed: Aug. 25, 1981

[30] Foreign Application Priority Data

Sep. 23, 1980 [DE] Fed. Rep. of Germany ....... 3035849

[51] Int. Cl.³ .............................................. G02B 5/174
[52] U.S. Cl. .............................. 350/96.12; 350/96.11; 350/96.19; 350/162.24
[58] Field of Search ................. 350/3.72, 96.11, 96.12, 350/96.13, 96.14, 96.19, 162.20, 162.21, 162.23, 162.24

[56] References Cited

U.S. PATENT DOCUMENTS

| 3,814,498 | 6/1974 | Tomlinson et al. | 350/96.19 |
| 3,995,937 | 12/1976 | Baues et al. | 350/96.12 |
| 4,262,996 | 4/1981 | Yao | 350/96.19 |
| 4,297,704 | 10/1981 | Marom et al. | 350/96.13 X |
| 4,394,060 | 7/1983 | Verber et al. | 350/96.13 |

FOREIGN PATENT DOCUMENTS 527973 8/1977 U.S.S.R. ............................ 350/96.14

OTHER PUBLICATIONS

Tien, "Method of Forming Novel Curved-Line Gratings and . . . ,", *Optics Letters*, vol. 1, No. 2, Aug. 1977, pp. 64–66.
Ramey et al., "Polyurethane Fan-Out Channel Waveguide Array . . . ,", *IEEE Trans. on Circuits & Systems*, vol. Cas-26, No. 12, Dec. 1979, pp. 1041–1048.
M. G. F. Wilson and M. C. Bone, "Theory of Curved Diffraction Gratings", *Workshop on Integrated Optics*, Technical University Berlin, May 12–13, 1980, pp. 85–111.

*Primary Examiner*—John D. Lee
*Attorney, Agent, or Firm*—Hill, Van Santen, Steadman & Simpson

[57] ABSTRACT

The planar waveguide Bragg lens and a component utilizing a planar waveguide Bragg lens with a greater acceptance angle characterized by several grating structures being arranged in series and having an inclination towards one another for varying angles of incidence. In one embodiment, each of the grating structures are circular arc segments which are interconnected together to form a single grating structure having curved segments which also has a greater acceptance angle than a conventional planar waveguide Bragg lens.

13 Claims, 3 Drawing Figures

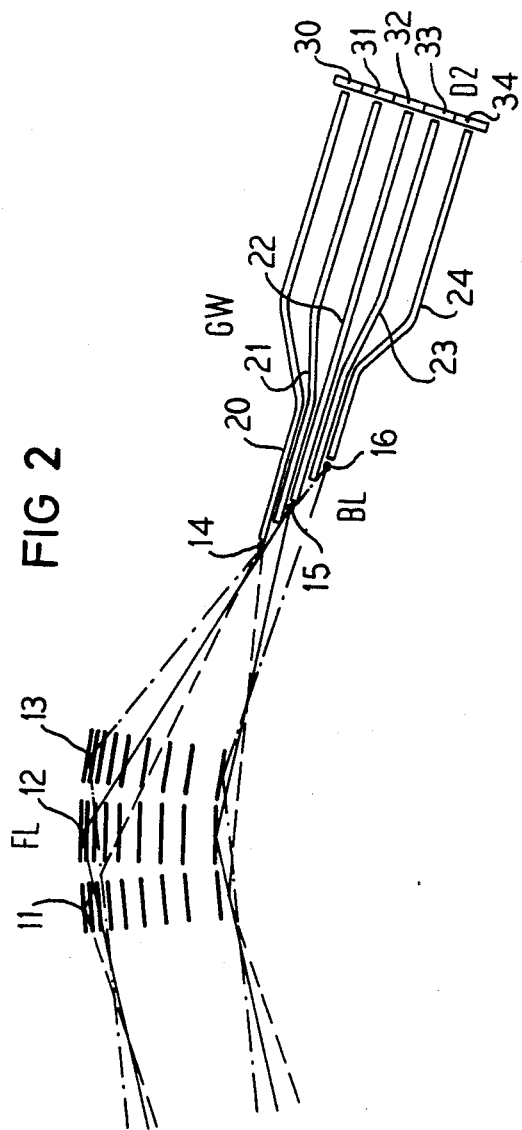

PLANAR WAVEGUIDE BRAGG LENS AND ITS UTILIZATION

BACKGROUND OF THE INVENTION

The invention is directed to a planar waveguide Bragg lens.

Planar optical components frequently require lenses which collimate the light of a laser diode or focus the collimated light. A typical example is an integrated optical spectrum analyzer in which the light emerging from the laser diode is collimated by means of a first lens and then bent by an ultrasonic Bragg cell and finally focused on a row of detectors with a second lens such as the Fourier lens. Since the deflection angle is proportional to the frequency, it is possible to associate a specific frequency band with each detector element. As waveguides lenses, grating lenses, in the form of Bragg lenses are of a particular interest because they can be manufactured in a conventional planar technology in a simple and reproduceable fashion and because they exhibit a high bending or deflection efficiency.

Up to the present time, planar waveguide Bragg lenses were only manufactured with a straight grating structure. However, this straight grating structure has a high bending or deflection efficiency only for a very small acceptance angle range.

SUMMARY OF THE INVENTION

The present invention is directed to realizing a planar waveguide Bragg lens which exhibits a larger acceptance angle than is possible with conventional Bragg lenses having straight grating structures.

In accordance with this invention, this object is achieved in a planar waveguide Bragg lens which has several or a plurality of grating structures arranged in series with each of the structures being inclined at a different angle of incidence respectively so that the range of the angle of incidence of the individual grating structures overlap. In an embodiment of the invention, the individual grating structures are connected by means of circular arcuate segments and the straight grating structure are also replaced by circular arcuate or arc-like segments.

Instead of several serially arranged lenses, a single thick lens with curved grating surfaces or fingers can be utilized, if the Bragg condition is satisfied with sufficient accuracy for various angles of incidence when striking a different area or part of the curved structure of the fingers.

In the case of the inventive design of the planar waveguide Bragg lenses, the incident light interacts strongly only with the grating structure or the part of the curved grating structure respectively for which the Bragg condition is satisfied. If any planar waveguide is employed for a planar optical component with detector elements, then it is expedient to first couple the focused light into waveguides which are arranged on a line of the focal points and to use these waveguides to carry the light to the detector elements. In particular, strip waveguides can thus be utilized for guiding the light from the line of the various focal points to the detector elements. The waveguides can be simultaneously spread out so that an adaptation to the detector array which has an internal spacing between detectors, which is greater than the spacing between the focal points, is also possible.

In the case of the inventive planar waveguide Bragg lenses, the tandem arranged grating structures or parts of the curved grating structures can have varying focal lengths. In particular, the plane or line of focal points of the entire lens structure can lie perpendicular to the optical axis.

Grating lenses can be manufactured in planar technology and hence with the greater dimensional stability. Also this positioning is possible with the precision customary in planar technology which precision is better than or equal to 1 μm.

BRIEF DESCRIPTION OF THE DRAWINGS

FIG. 2 is a schematic cross-sectional view of a spread out or spaced waveguide structure utilized with an inventive Fourier lens of the present invention.

DESCRIPTION OF THE PREFERRED EMBODIMENTS

Figure 1:
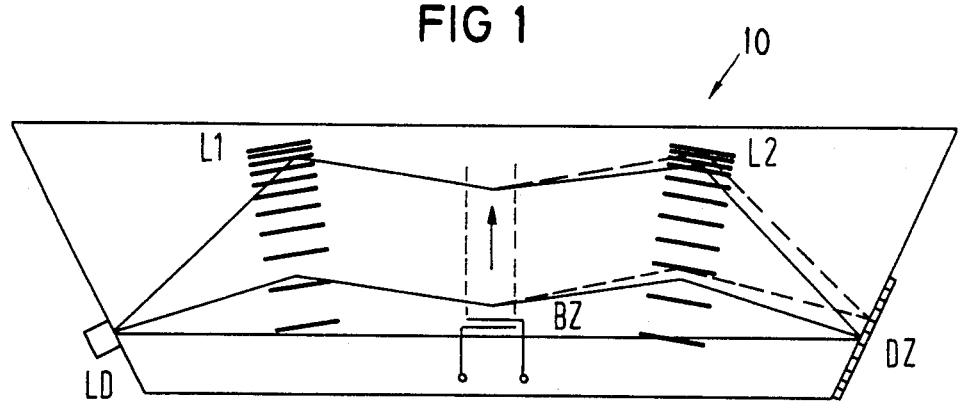
FIG. 1 is a schematic cross-sectional view of a construction of an optical RF-spectrum analyzer.

The principles of the present invention are particularly useful when the lenses L1 and L2 are frequently required for planar optical components which utilize a waveguide technology. A typical example is an integrated optical spectrum analyzer generally indicated as 10 in FIG. 1 in which a light emerging from a laser diode LD is collimated by a first lens $L_1$ into a parallel extending range which is then bent or deflected by an ultrasonic Bragg cell BZ. After passing through the Bragg cell BZ, the light is focused by a second lens L2, which is a Fourier lens, onto individual detectors of a detector row DZ. For the lenses, grating lenses appear of particular interest because they can be manufactured by the planar technique in a simple fashion with good reproducibility and the adjustment of the lenses in relation to the Bragg cell and the detector can proceed with high precision.

In order to produce the grating lens in waveguides, only minor changes of refractive index are necessary. Grating lenses are also advisable for substrates with a high index of refraction, such as for example $LiNbO_3$. For an RF-spectrum analyzer 10, a high resolution capacity, i.e. a high aperture ratio and a high optical cross-talk attenuation between adjacent frequency channels is required of the Fourier transform lens. The last requirement precludes axially symmetrical lenses because in this case the zero order of the diffraction is superimposed on the signal and thus cross-talk is unavoidable. Therefore, advantageously off-axial lenses are employed for the RF-spectrum analyzers such as 10.

Of the grating lenses, the off-axis Bragg lens is the most suitable; however, in the present known embodiments, it has a great disadvantage because it exhibits a good bending or deflection efficiency only for an incident angle of only a small range or size. In the following, this angular range in which parallel incident light is focused with the high deflection efficiency is designated as an acceptance angle of the Bragg lens.

The acceptance angle of the conventional Bragg lenses with straight fingers or gratings is too small for Fourier lenses in a wide band optical spectrum analyzer. For the first time, a new embodiment of the Bragg lenses is proposed wherein several simple Bragg lenses are arranged in series and inclined relative to one another in such a fashion that from the overlapping of the individual acceptance angles a significantly greater acceptance angle results.

If the individual grating structures are connected by means of circular arculate or curved segments and if the straight grid structures are likewise replaced by circular arcuate or curved segments, one then obtains a single thick grating with a circular arcuate or cu ved segments shaped progression of the curved grid fingers or segments.

Because the grating structure of parts which are designed for light having varying angles of incidence but are designed for equal focal lengths, are arranged in series, the focal line or spots for light of different angles of incidence lie, in the case of these two lens types on a curved plane or line extending obliquely to the optical axis. The detector row in the case of the spectrum analyzer 10 would then likewise have to be arranged obliquely to the optical axis. In the case of a material with a high index of refraction, such as LiNbO$_3$, the light on the interface or boundary surface between the LiNbO$_3$ and air would then be totally reflected and would no longer couple into the detector. Therefore, for this instance, an arrangement is proposed in which the focused light is first coupled into strip-like waveguides which are positioned at the plane or line of focal points and the waveguides then guide the light to the detector elements which are now arranged in a line perpendicular to the optical axis of the waveguides. The light waveguides can also be spread out to match the spacing of the detector row which has greater intervals between detectors than between the corresponding focal lines or spots.

As illustrated in FIG. 2, a Fourier lens having three grating structures 11, 12 and 13 will focus light of three separate angles of incidence in to three focal points 14, 15 and 16 which lie on focal line represented by line BL. A spread waveguide structure GW has a plurality of waveguides such as 20-24 and extends from the line BL to a row D2 of detectors such as 30-34. As illustrated each waveguide is positioned with an end face at the line BL for receiving light coupled from the focal line, for example the end of the waveguide 20 is positioned at focal point 14 to receive light and convey it to the detector 30. The waveguides such as 20-24 diverge apart as they extend from the line BL so that the spacing between the detectors 30-34 is greater than the spacing between the end faces of the waveguides 20-24 at the line BL and between possible positions of the focal line. The detector row D2 is arranged with regard to the optical axis to take into account the index of refraction of the substrate so that the light at the boundary surface of the substrate/air is not totally reflected but on the contrary can be coupled into the detector of the detector row D2. It is pointed out that the Fourier lens FL illustrated in FIG. 2 represents the inventive planar waveguide Bragg lens in which three mutually inclined grating structures 11, 12 and 13 are arranged in series for varying angles of incidence respectively so that the range of the incident angle of the individual grating structures overlap.

Figure 3:
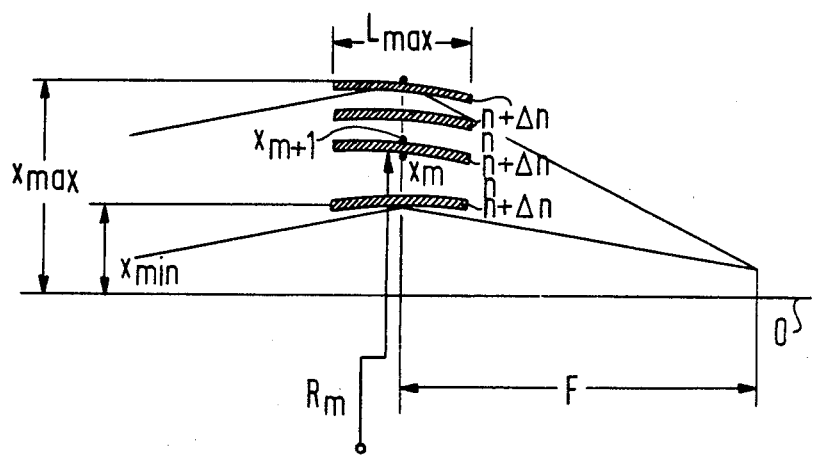
FIG. 3 is a cross-sectional view of the inventive Bragg lens with a curved grating structure in accordance with the present invention.

In the following the lens properties according to the theory of M. G. F. Wilson and M. C. Bone, "Theory of curved Diffraction Gratings", preprint, content was presented at the "Workshop for Integrated Optics" Technical University, Berlin, May 12-13, 1980, is assessed for curved gratings, and the formulas for calculating the lens with circular arc-shaped grating structures is disclosed. FIG. 3 illustrates an inventive Bragg lens with the curved grating fingers or structure. In FIG. 3, $X_m$ is the distance or interval of the center of the lower border of the grid finger or segment (m, m+1) from the optical axis 0, wherein $X_{m+1} - X_m$ is the thickness of the grating finger (m, m+1). $X_{min}$ and $X_{max}$ are the smallest and greatest occurring intervals with $X_{max}$ being the interval of the center of the upper border of the uppermost grating finger from the optical axis 0. The values $X_{min}$, $X_{max}$ are dependent upon the aperture ratio Ö of the lens with a focal length F, and is found in accordance with the following formula:

$$Ö = (X_{max} - X_{min})/F$$

$\theta_m$ designates the Bragg angle for rays incident parallel to the optical axis which are reflected at the center of the grating fingers. $L_m$ and $R_m$ are the length and the radius of curvature of the grating finger (m, M+1). n or n+Δn, respectively, finally indicate the effective refractive index of the waveguide or the grating finger, respectively.

In the following, the formulas for calculating the Bragg lens with a curved grating fingers are listed. Given are the values for the focal length F, the minimum $X_{min}$ and maximum $X_{max}$ distance or interval of the centers of the upper and lower surface of the grating fingers from the optical axis, the vacuum wavelength $\lambda_O$, the substrate refractive index n, the sound velocity v of the substrate surface waves, and the RF-band width Δf of the Bragg cell.

The center intervals or distances of the upper and lower edges of the grating fingers $X_m$ and the respective Bragg angles $\theta_m$ are calculated in the same manner as for grating lenses with straight fingers. According to the following formulas:

$$X_m = \sqrt{\frac{2m+1}{2} F \frac{\lambda_o}{n} + \left(\frac{2m+1}{4} + \frac{\lambda_o}{n}\right)^2}$$

$$\theta_m = \frac{1}{2} \arctan \frac{X_m}{F}$$

$$X_{min} \leq X_m \leq X_{max}, \quad m \epsilon N$$

It is to be demanded of the acceptance angle Δφ of the Bragg lens that it be equal to the bending or deflection range of the Bragg cell, i.e. the formula $$\Delta\phi = \frac{\lambda_o}{nV} \cdot \Delta f$$

Now, the length $L_m$ and the radius $R_m$ of the grating fingers can be calculated with the result of the cited work of Wilson and Bone. The theoretical deflection efficiency (the intensity of the deflected light/intensity of the transversing light) of 90% is assumed here. The calculations of the formulas for the other values of the deflection efficiency is possible. Moreover, it is assumed that the light in the lens is subject to only one Bragg reflection. Thus $L_m$ and $R_m$ are determined by the formulas:

$$L_m = \frac{19}{c} \left(\frac{\Delta\phi}{2\theta_m} + 1\right)$$

and

-continued $$R_m = \frac{19}{2c\theta_m}$$

$$R_m = (19/2c\theta_m)$$

In the above, c is the coupling intensity of the Bragg lens according to the formula $$c = \frac{\theta_{min}^2 \cdot 2\pi\eta}{5\lambda_o} \text{ with } \theta_{min} = \frac{1}{2} \text{ arc tan } \frac{X_{min}}{F}$$

For the definition of the coupling intensity disclosed in the cited theory of Wilson and Bone, finally the refractive index $\Delta$ n necessary for the grating finger or structure can be calculated according to the following equations:

$$c = \frac{\pi \cdot n\Delta\epsilon}{\lambda_o \cdot 2'\epsilon_o \cos\theta_m}$$

$$c \approx \frac{\pi \cdot n \cdot \Delta\epsilon}{\lambda_o \cdot 2 \cdot \epsilon_o} \text{ (for customary values of } \theta_m\text{)}.$$

$$\Delta\eta = \sqrt{\epsilon_o + \Delta\epsilon} - n; \epsilon_o = n^2$$

The centers of the grating fingers of the inventive Bragg lens are shown in FIG. 3 and lie on a line perpendicular to the optical axis. The curved grating fingers of this inventive Bragg lens are inclined relative to one another. This inclination of the curved grating fingers to one another corresponds to the inclination of the straight grating fingers to one another in the case of the conventional Bragg lens whose grating finger centers exhibit the same position as the curved grating centers of the inventive Bragg lens if the inclination of the straight grating fingers to one another in the case of the conventional Bragg lens causes rays which are incident parallel to the optical axis to be bent or deflected toward the same focal point.

Finally, additional reference is made to a further possible embodiment. The series of disposed lenses with varying focal lengths can be manufactured in such a fashion that the focal line of the entire lens structure lie on a plane which is disposed perpendicular to the optical axis. Likewise, here also, the individual straight grating fingers can again be replaced by continuous curved grating fingers so that a single curved grating structure results. However, the curvature of the grating structure is then of course no longer of a circular arcuate shape.

The improved Bragg lenses proposed herein have a high bending or defraction efficiency over a large acceptance angle.

As pointed out hereinabove, the improved Bragg lenses whether they are a series of Bragg lenses arranged with the slight tilt towards one another for respectively varying angles of incidence or whether it is a single lens structure having a curved grating structure with varying angles of incidence in accordance with the present invention are particularly useful when incorporated into a planar optical component having detector elements such as illustrated in FIG. 1 as optical RF-spectrum analyzer. The lens structure is particularly useful in an analyzer which utilizes waveguides for conducting the light from a point source e.g. diode or collimated light e.g. from a gaslines to the respective detector elements.

Although various minor modifications may be suggested by those versed in the art, it should be understood that we wish to embody within the scope of the patent granted hereon, all such modifications as reasonably and properly come within the scope of our contribution to the art.

We claim:

1. A planar, waveguide Bragg lens being off-axis with a high deflection efficiency for light of various angles of incidence, said lens comprising a plurality of grating structures being arranged in series and each of said structures having grating elements being inclined relatively towards the elements of the other structures so that the ranges of the angle of incidence of the individual grating structures overlap and light from various point sources can be imaged with approximately equal quality by said lens.

2. A planar waveguide Bragg lens according to claim 1, wherein the grating structures have different focal lengths.

3. A planar waveguide Bragg lens according to claim 2, wherein the focal line of the different focal points of the entire lens structure lies on a plane extending substantially perpendicular to the optical axis.

4. A planar waveguide Bragg lens according to claim 1, wherein each of grating elements of each of the grating structures is a circular arcuate segment and the individual grating structures are connected by means of circular arcuate segments so that a curved grating structure for varying angles of incidence is produced.

5. A planar waveguide Bragg lens according to claim 4, wherein different parts of the curved grating structure have different focal lengths.

6. A planar waveguide Bragg lens according to claim 5, wherein the focal line of the different focal points of the entire lens structure lie on a plane extending substantially perpendicular to the optical axis.

7. A planar waveguide Bragg lens being off-axis with a high deflection efficiency for light of various angles of incidence, said lens comprising a curved grating structure having different parts at different angles for receiving light with varying angles of incidence and said parts satisfying the Bragg condition so that light from various point sources can be imaged with approximately equal quality.

8. A planar waveguide Bragg lens according to claim 7 wherein the parts of the curved grating structure have varying focal lengths.

9. A planar waveguide Bragg lens according to claim 8, wherein the focal line of the focal points of the entire lens structure lie on a plane extending substantially perpendicular to the optical axis.

10. In a planar optical component utilizing a planar waveguide Bragg lens and a plurality of detector elements, the improvement comprising the planar waveguide Bragg lens being off-axis with a high deflection efficiency for light of various angles of incidence, said lens comprising a plurality of grating structures arranged in series and each grating structure having grating elements being inclined relatively towards the elements of other structures at varying angles so that the range of the angle of incidence of the individual grating structures overlap and light from various point sources can be imaged with approximately equal quality by said lens, and said component includes waveguides extending between a plane of focal points for the Bragg lens and the detector elements.

11. In a planar optical component according to claim 10, wherein the waveguides are strip waveguides.

12. In a planar optical component according to claim 10, wherein the waveguides extending from the plane of focal lines to the detector elements diverge apart and said detector elements are arranged at a greater interval than the spacing between focal lines on said plane.

13. In a planar component according to claim 10, wherein the grating elements of each of the grating structures are circular arcuate segments and the individual grating structures are connected by means of circular arcuate segments so that a single lens having a curved grating structure is formed.

* * * * *